US012725433B2

(12) United States Patent
Zhang et al.

(10) Patent No.: US 12,725,433 B2
(45) Date of Patent: Sep. 1, 2026

(54) METHOD AND APPARATUS FOR DETECTING WEARING OF SAFETY BELT, AND STORAGE MEDIUM AND PROCESSOR

(71) Applicant: ArcSoft Corporation Limited, Hangzhou (CN)

(72) Inventors: Zhaohang Zhang, Hangzhou (CN); Jin Wang, Hangzhou (CN)

(73) Assignee: ArcSoft Corporation Limited, Hangzhou (CN)

( * ) Notice: Subject to any disclaimer, the term of this patent is extended or adjusted under 35 U.S.C. 154(b) by 522 days.

(21) Appl. No.: 18/259,381

(22) PCT Filed: Dec. 24, 2021

(86) PCT No.: PCT/CN2021/141357

§ 371 (c)(1),
(2) Date: Jun. 26, 2023

(87) PCT Pub. No.: WO2022/135589

PCT Pub. Date: Jun. 30, 2022

(65) Prior Publication Data

US 2024/0062557 A1 Feb. 22, 2024

(30) Foreign Application Priority Data

Dec. 26, 2020 (CN) ......................... 202011570898.8

(51) Int. Cl.
*G06V 20/59* (2022.01)
*B60W 40/08* (2012.01)
(Continued)

(52) U.S. Cl.
CPC ........... *G06V 20/593* (2022.01); *B60W 40/08* (2013.01); *B60W 50/14* (2013.01); *G06V 10/25* (2022.01);
(Continued)

(58) Field of Classification Search
CPC .... G06V 20/593; G06V 10/25; G06V 40/161; G06V 2201/07; B60W 2540/223;
(Continued)

(56) References Cited

U.S. PATENT DOCUMENTS 9,878,689 B1 1/2018 Jimenez et al.
2011/0292232 A1* 12/2011 Zhang .................... H04N 23/90 348/222.1

(Continued)

FOREIGN PATENT DOCUMENTS

CN 105373779 A 3/2016
CN 106485224 A 3/2017

(Continued)

OTHER PUBLICATIONS

Office Action issued in corresponding DE Application No. 112021006213.1 with English translation dated Jun. 3, 2024 (10 pages).

(Continued)

*Primary Examiner* — David Perlman
(74) *Attorney, Agent, or Firm* — Osha Bergman Watanabe & Burton LLP

(57) ABSTRACT

A safety belt wearing detection method includes: acquiring a target image collected from a traffic device; determining a first image region and/or a second image region in the target image, the first image region being a region where a human torso of a target object in the target image is located, the second image region being a region where a face of the target object in the target image is located; determining a third image region according to the first image region and/or the second image region, the third image region being a safety belt wearing region in the target image; and determining whether wearing of a safety belt in the target image
(Continued)

meets a preset wearing requirement according to image information in the third image region.

13 Claims, 4 Drawing Sheets

(51) Int. Cl.
*B60W 50/14* (2020.01)
*G06V 10/25* (2022.01)
*G06V 10/82* (2022.01)
*G06V 40/16* (2022.01)

(52) U.S. Cl.
CPC ............ *G06V 10/82* (2022.01); *G06V 40/161* (2022.01); *B60W 2040/0881* (2013.01); *B60W 2420/403* (2013.01); *B60W 2540/223* (2020.02); *G06V 2201/07* (2022.01)

(58) Field of Classification Search
CPC ... B60W 2040/0881; B60W 2420/403; B60W 40/08; B60W 50/14
See application file for complete search history.

(56) References Cited

U.S. PATENT DOCUMENTS

2013/0322720 A1* 12/2013 Hu ............................ G06T 7/75 382/131
2016/0078306 A1* 3/2016 Artan ................... G06V 10/764 382/104
2019/0225186 A1 7/2019 Szawarski et al.
2020/0172048 A1* 6/2020 Jo ........................... B60R 22/48
2020/0231109 A1* 7/2020 Baltaxe ................ G06V 10/764
2021/0150235 A1* 5/2021 Meskimen ............. G06Q 50/40
2022/0006974 A1* 1/2022 Wang ..................... G06N 3/045

FOREIGN PATENT DOCUMENTS

CN 106650567 A 5/2017
CN 109460699 A 3/2019
CN 111582077 A 8/2020
CN 111950348 A 11/2020

OTHER PUBLICATIONS

Office Action issued in corresponding JP Application No. 2023-539158 with English translation dated Jun. 18, 2024 (10 pages).
International Search Report issued in International Application No. PCT/CN2021/141357 dated Mar. 23, 2022 (2 pages).
Written Opinion issued in International Application No. PCT/CN2021/141357 dated Mar. 23, 2022 (3 pages).

* cited by examiner

METHOD AND APPARATUS FOR DETECTING WEARING OF SAFETY BELT, AND STORAGE MEDIUM AND PROCESSOR

CROSS-REFERENCE TO RELATED APPLICATIONS

The present application claims the priority of Chinese Patent Application No. 202011570898.8 filed on Dec. 26, 2020 and PCT Application No. PCT/CN2021/141357 filed on Dec. 24, 2021, entitled "METHOD AND APPARATUS, STORAGE MEDIUM AND PROCESSOR FOR SAFETY BELT WEARING DETECTION", the entire contents of which are herein incorporated by reference.

TECHNICAL FIELD

The present application relates to the technical field of image recognition, and in particular to a method and apparatus, a storage medium and a processor for safety belt wearing detection.

BACKGROUND

With the development of cities and the growth in the living standard of residents, the demand for various vehicles grows with each passing day, which is followed by technical innovations and industrial upgrades around how to ensure the safety of occupants in vehicles during driving.

Safety belts serve as a close-fitting protection means for the occupants in vehicles in the case of emergencies during driving, and in some cities, it is also compulsory for passengers in the front passenger's seats of vehicles to wear safety belts. Therefore, how to accurately determine whether users wear safety belts has also attracted more attention.

In the related art, a safety belt determination solution takes whether a buckle at the end of a safety belt of a passenger or driver is fitted into a detection slot as a main determination basis. Specifically, after the end of the safety belt is connected with the detection slot, a detection loop is formed inside the vehicle, and the system obtains a feedback that the safety belt is worn. However, this determination mechanism not only increases the complexity of physical devices and systems inside the vehicle, but also increases the cost. Moreover, there are loopholes in the detection mechanism, which are easily utilized by people who shirk from wearing the safety belts, and thus spoofing means deliberately adopted by related occupants so as not to wear the safety belts (for example, an object similar to the buckle at the end of the safety belt that is inserted into the detection slot so that the system mistakenly deems that the passenger in that seat has buckled the safety belt) cannot be avoided. In addition, it is impossible to make a further determination on such states as whether an occupant correctly wears the safety belt.

In the related art that it is difficult to accurately determine whether a passenger correctly wears a safety belt, and an effective solution has not been proposed up to now.

SUMMARY

At least some embodiments of the present application provide a method and apparatus, a storage medium and a processor for safety belt wearing detection, to accurately determine whether a passenger correctly wears a safety belt.

According to one embodiment of the present application, a safety belt wearing detection method is provided. The method includes: acquiring a target image collected from a traffic device; determining a first image region and/or a second image region in the target image, wherein the first image region is a region where a human torso of a target object in the target image is located, and the second image region is a region where a face of the target object in the target image is located; determining a third image region according to the first image region and/or the second image region, wherein the third image region is a safety belt wearing region in the target image; and according to image information in the third image region, determining whether wearing of a safety belt in the target image meets a preset wearing requirement.

Optionally, in a case where an upper body region of the target object appears in the target image, a region where the human torso of the target object is located is a minimum region including the face, a neck, a shoulder, and an upper chest; and a region where the face of the target object is located is a minimum region including the face.

Optionally, prior to acquiring the target image collected from the traffic device, the method further includes: acquiring a plurality of images collected from the traffic device, marking whether the acquired images include human torso regions, and marking positions of the human torso regions on the images including the human torso regions, to obtain a plurality of first marked images; determining the plurality of first marked images as a first training set of data, and training a neural network model through the first training set of data, to obtain a first detector configured to detect the human torso regions; and/or acquiring a plurality of images collected from the traffic device, marking whether the acquired images include face regions, and marking positions of the face regions on the images including the face regions, to obtain a plurality of second marked images; and determining the plurality of second marked images as a second training set of data, and training the neural network model through the second training set of data, to obtain a second detector configured to detect the face regions.

Optionally, in a case where the first detector and the second detector are obtained, determining the first image region in the target image includes detecting the target image by the first detector to obtain the first image region, and determining the second image region in the target image includes detecting the target image by the second detector to obtain the second image region. In a case where the first detector is obtained, determining the first image region in the target image includes detecting the target image by the first detector to obtain the first image region, and determining the second image region in the target image includes extracting the second image region from the first image region according to preset sitting posture information of the target object. In a case where the second detector is obtained, determining the second image region in the target image includes detecting the target image by the second detector to obtain the second image region, and determining the first image region in the target image includes expanding, in the target image, the second image region downwards, leftwards, and rightwards by preset regions to obtain the first image region according to the preset sitting posture information of the target object.

Optionally, determining the third image region according to the first image region and/or the second image region includes: in a case where the first image region in the target image is obtained and the second image region in the target image is obtained, determining a first safety belt wearing region in the target image according to an offset distance of a coverage region in which the safety belt is correctly worn relative to the first image region, and determining a second safety belt wearing region in the target image according to an offset distance of the coverage region in which the safety belt is correctly worn relative to the second image region; and averaging the first safety belt wearing region and the second safety belt wearing region with respect to spatial positions on the target image to obtain the third image region.

Optionally, prior to determining the third image region according to the first image region and/or the second image region, the method further includes: acquiring a plurality of human torso region images, marking whether the acquired images include safety belt wearing regions, and marking positions of face regions on the images including the safety belt wearing regions to obtain a plurality of third marked images; determining the plurality of third marked images as a third training set of data, and training the neural network model through the third training set of data to obtain a third detector configured to detect the safety belt wearing regions. In a case where the first image region in the target image is obtained and the second image region in the target image is obtained, determining the third image region according to the first image region and/or the second image region includes inputting a position of the first image region in the target image, a position of the second image region in the target image, and the first image region into the third detector for detection, to obtain the third image region.

Optionally, prior to determining the third image region according to the first image region and/or the second image region, the method further includes: acquiring a plurality of human torso region images, marking whether the acquired images include safety belt wearing regions, and marking positions of the safety belt wearing regions on the images including the safety belt wearing regions to obtain a plurality of fourth marked images; determining the plurality of fourth marked images as a fourth training set of data, and training the neural network model through the fourth training set of data to obtain a fourth detector configured to detect the safety belt wearing regions. In a case where the first image region is detected in the target image, determining the third image region according to the first image region and/or the second image region includes detecting the first image region by the fourth detector to obtain the third image region.

Optionally, prior to determining the third image region according to the first image region and/or the second image region, the method further includes: acquiring a plurality of images including face regions, marking whether the acquired images include safety belt wearing regions, and marking positions of the safety belt wearing regions on the images including the safety belt wearing regions to obtain a plurality of fifth marked images; determining the plurality of fifth marked images as a fifth training set of data, and training the neural network model through the fifth training set of data to obtain a fifth detector configured to detect the safety belt wearing regions. In a case where the second image region is detected in the target image, determining the third image region according to the first image region and/or the second image region includes detecting the second image region by the fifth detector to obtain the third image region.

Optionally, prior to determining whether the wearing of the safety belt in the target image meets the preset wearing requirement according to the image information in the third image region, the method further includes: acquiring a plurality of safety belt wearing region images, marking whether the wearing of the safety belt in the acquired images meets the preset wearing requirement, to obtain a plurality of sixth marked images; determining the plurality of sixth marked images as a sixth training set of data, and training the neural network model through the sixth training set of data to obtain a discriminator configured to determine whether the wearing of the safety belt in the target image meets the preset wearing requirement. Determining whether the wearing of the safety belt in the target image meets the preset wearing requirement according to the image information in the third image region includes detecting the third image region by the discriminator to obtain a conclusion of whether the wearing of the safety belt meets the preset wearing requirement.

Optionally, after determining whether the wearing of the safety belt in the target image meets the preset wearing requirement according to the image information in the third image region, the method further includes: in a case where the wearing of the safety belt does not meet the preset wearing requirement, sending prompt information, wherein the prompt information is configured to prompt a passenger to correctly wear the safety belt.

Another embodiment of the present application further provides a safety belt wearing detection apparatus. The apparatus includes: a first acquisition unit configured to acquire a target image collected from a traffic device; a first determination unit configured to determine a first image region and/or a second image region in the target image, wherein the first image region is a region where a human torso of a target object in the target image is located, and the second image region is a region where a face of the target object in the target image is located; a second determination unit configured to determine a third image region according to the first image region and/or the second image region, wherein the third image region is a safety belt wearing region in the target image; and a discrimination unit configured to determine whether wearing of a safety belt in the target image meets a preset wearing requirement according to image information in the third image region.

Another embodiment of the present application further provides a non-volatile storage medium. The non-volatile storage medium includes a program stored therein, wherein when executed, the program controls a device where the non-volatile storage medium is located to execute a safety belt wearing detection method.

Another embodiment of the present application further provides an electronic device. including a processor and a memory. Computer-readable instructions are stored in the memory, and the processor is configured to execute the computer-readable instructions, wherein when executed, the computer-readable instructions execute a safety belt wearing detection method.

By the present application, the following steps are adopted to accurately determine whether a passenger correctly wears a safety belt: acquiring a target image collected from a traffic device; determining a first image region and/or a second image region in the target image, wherein the first image region is a region where a human torso of a target object in the target image is located, and the second image region is a region where a face of the target object in the target image is located; determining a third image region according to the first image region and/or the second image region, wherein the third image region is a safety belt wearing region in the target image; and according to image information in the third image region, determining whether wearing of a safety belt in the target image meets a preset wearing requirement. The safety belt wearing region is determined through the region where the human torso of the target object in the target image is located and/or the region where the face of the target object in the target image is located, thereby determining whether the wearing of the safety belt meets the preset wearing requirement, and thus achieving the effect of improving the accuracy of determining whether the passenger correctly wears the safety belt.

BRIEF DESCRIPTION OF DRAWINGS

The drawings constituting a part of the present application are used for providing a further understanding of the present application, and schematic embodiments of the present application and the descriptions thereof are used for explaining the present application, but do not constitute improper limitations on the present application. In the drawings.

DETAILED DESCRIPTION

It should be noted that, embodiments in the present application and features in the embodiments may be combined with each other where no conflicts exist. Next, the present application will be described in detail with reference to the drawings and in conjunction with the embodiments.

In order that those skilled in the art may better understand the solutions of the present application, a clear and complete description of technical solutions in the embodiments of the present application will be given below, in combination with the drawings in the embodiments of the present application. Apparently, the embodiments described below are merely a part, but not all, of the embodiments of the present application. All of the other embodiments, obtained by those having ordinary skill in the art based on the embodiments in the present application without any creative effort, fall into the protection scope of the present application.

It should be noted that, the terms “first”, “second”, and the like in the specification, claims, and the above-mentioned drawings of the present application are used for distinguishing similar objects, and are not necessarily used for describing a specific sequence or precedence. It should be understood that the data used in this way may be interchanged under appropriate circumstances, so that the embodiments of the present application are described herein. In addition, the terms “including” and “having”, and any variations thereof, are intended to cover non-exclusive inclusions. For example, processes, methods, systems, products or devices including a series of steps or units are not necessarily limited to those explicitly listed steps or units, but may include other steps or units that are not explicitly listed or are inherent to these processes, methods, products or devices.

First Embodiment

According to a First Embodiment of the present application, a safety belt wearing detection method is provided.

Figure 1:
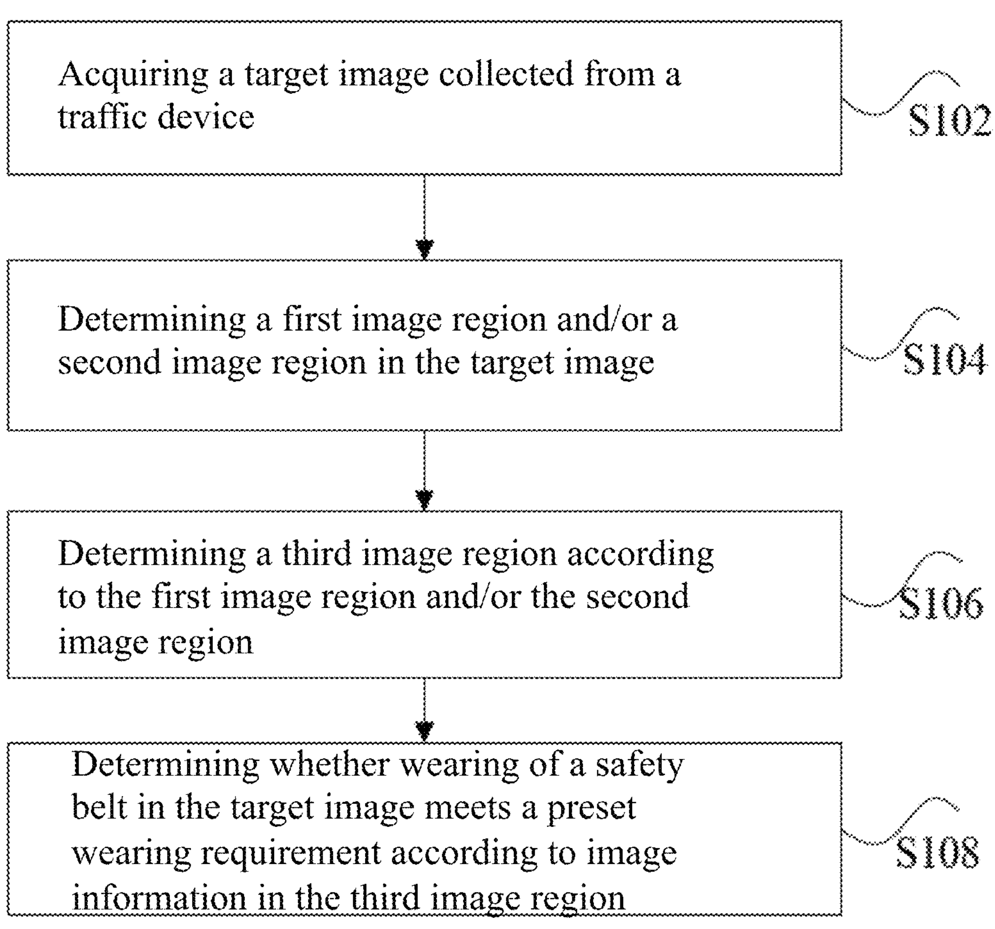
FIG. 1 is a flowchart of a safety belt wearing detection method provided according to a First Embodiment of the present application.

FIG. 1 is a flowchart of a safety belt wearing detection method provided according to the First Embodiment of the present application. As shown in FIG. 1, the method includes the following steps:

In Step S102, a target image collected from a traffic device is acquired.

Specifically, the target image collected from the traffic device may be a scene image collected from a cockpit or a crew cabin of the traffic device, wherein the traffic device may be a vehicle, and may also be devices requiring occupants to wear safety belts, such as a cabin and a ferryboat. The type of the traffic device is not limited in the First Embodiment of the present application.

In Step S104, a first image region and/or a second image region in the target image is determined, wherein the first image region is a region where a human torso of a target object in the target image is located, and the second image region is a region where a face of the target object in the target image is located.

Specifically, the target object may be a human body. The first image region refers to a determined human torso region of interest (ROI) when the human torso of the human body is detected. Since the English for human torse detection is Human Torso Detection, referred to as HTD for short, the first image region may be referred to as an HTROI region. The second image region refers to a determined face region of interest when a face is detected. Since the English for face detection is Face Detection, referred to as FTD for short, the second image region may be referred to as an FTROI region for short.

The region of interest refers to a rectangular sub-image of a certain region in a complete image. Taking the HTROI region for example, assuming that the resolution of the complete target image is 1280×800, if the coordinates of a upper left corner of the HTROI region obtained by regression are (100, 100) and the coordinates of a lower right corner are (350, 780), then the HTROI region in the target image only includes content in a region from (100, 100) to (350, 780) in the complete image. This is equivalent to extracting a region with a resolution of 250×680 from (100, 100) in the target image.

Optionally, in the safety belt wearing detection method provided in the First Embodiment of the present application, in the case where the target image includes an upper body region of the target object, the region where the human torso of the target object is located is a minimum region including a face, a neck, a shoulder and an upper chest, and the region where the face of the target object is located is a minimum region including the face.

Figure 2:
FIG. 2 is a schematic diagram of detecting a first image region in the safety belt wearing detection method provided according to the First Embodiment of the present application.

For example, when the target object is a driver in the driver's seat, on the premise that the entire image includes the upper body of the driver in the driver's seat, the first image region is specifically defined as a minimum region which completely includes the face, the neck, the shoulder and the upper chest. As shown in FIG. 2, the region selected by a square frame is the first image region. The second image region is specifically defined as a minimum region including the face on the premise that the upper body of the driver in the driver's seat appears in the entire image.

In Step S106, a third image region according to the first image region and/or the second image region is determined, wherein the third image region is a safety belt wearing region in the target image.

Specifically, the third image region refers to a determined safety belt wearing region of interest when the safety belt wearing region is detected. Since the English for safety belt is Safety Belt, the third image region may be referred to as an SROI region for short.

In the First Embodiment of the present application, according to the size of the safety belt in an actual scene and by means of face detection and human torso detection, the detection region of the safety belt may be reduced to highlight the features of the safety belt itself, thereby improving the recognizability of the safety belt wearing region.

In Step S108, whether wearing of the safety belt in the target image meets a preset wearing requirement is determined according to image information in the third image region.

Specifically, after the third image region is acquired, information such as the position where a safety belt is actually worn in the third image region may be compared with information such as the position where a safety belt is correctly worn, to obtain a conclusion of whether the safety belt is correctly worn. According to a plurality of images including the safety belt wearing region, a discriminator configured to determine whether the safety belt is correctly worn may also be trained, to determine whether the safety belt is correctly worn by the discriminator.

By the First Embodiment of the present application, vision-based non-contact recognition of safety belt wearing states of occupants is realized, such that the result of determining the safety belt wearing states of occupants is more accurate while the device production cost is saved.

According to the safety belt wearing detection method provided in the First Embodiment of the present application, the difficulty in the related art to accurately determine whether a passenger correctly wears a safety belt is solved by: acquiring a target image collected from a traffic device; determining a first image region and/or a second image region in the target image, wherein the first image region is a region where a human torso of a target object in the target image is located, and the second image region is a region where a face of the target object in the target image is located; determining a third image region according to the first image region and/or the second image region, wherein the third image region is a safety belt wearing region in the target image; and according to image information in the third image region, determining whether wearing of a safety belt in the target image meets a preset wearing requirement. The safety belt wearing region is determined by means of the region where the human torso of the target object in the target image is located and/or the region where the face of the target object in the target image is located, thereby determining whether the wearing of the safety belt meets the preset wearing requirement, and thus achieving the effect of improving the accuracy of determining whether the passenger correctly wears the safety belt.

Optionally, in the safety belt wearing detection method provided in the First Embodiment of the present application, prior to acquiring the target image collected from the traffic device, the method further includes: acquiring a plurality of images collected from the traffic device, marking whether the acquired images include human torso regions, and marking positions of the human torso regions on the images including the human torso regions, to obtain a plurality of first marked images; determining the plurality of first marked images as a first training set of data, and training a neural network model through the first training set of data to obtain a first detector configured to detect the human torso regions; and/or, acquiring a plurality of images collected from the traffic device, marking whether the acquired images include face regions, and marking positions of the face regions on the images including the face regions, to obtain a plurality of second marked images; and determining the plurality of second marked images as a second training set of data, and training the neural network model by means of the second training set of data to obtain a second detector configured to detect the face regions.

It should be noted that in the First Embodiment of the present application, a training set of the detector based on a convolutional neural network (CNN) may be acquired in the following way: in the case where the target object is a driver in the driver's seat of a vehicle, a plurality of complete images of a driver's seat scene in the vehicle may be obtained in advance in a conventional data acquisition mode (for example, actual sampling). Specifically, the image data volume includes at least 10,000 images. Then, qualitative marking of whether a target content is included is performed one by one, and quantitative marking is performed on images including the content for ROI positions of the target content. The quantitative marking of each ROI position includes the upper left and lower right two-dimensional coordinate pairs of the target content in the complete image and whether the target is included, and all images and related qualitative and quantitative marking contents constitute the training set of the detector.

Further, the CNN-based detector may be trained in the following way: after the neural network is constructed, image data in the training set is randomly selected and input to the neural network according to different batches, and a weighting operation using different weights in the network is performed; various qualitative and quantitative conclusions included in the output results of the neural network and the marking data corresponding to the qualitative and quantitative conclusions are compared with the input data, and weight values in the neural network are adjusted according to a comparison error. The entire process is a round of training. After a plurality of rounds of training, the output conclusion of the neural network becomes more and more consistent with the real conclusion of calibration with the adjustment of the weights, and when the difference between the two is less than a certain degree or the number of times of training reaches an enough number of times, the training is stopped. The parameters of the detector are determined according to the weights in the trained neural network.

Specifically, in the case where the target object is the driver in the driver's seat, when the first detector (an HTROI region detector) configured to detect the human torso region is trained, the target content of the training set is the HTROI, the input data is images of an entire in-vehicle scene, the quantitative marking content is the upper left and lower right coordinate pairs of the HTROI region, and the qualitative marking content is whether the HTROI region is included. When the second detector (an FROI region detector) configured to detect the face region is trained, the target content of the training set is the FROI, the input data is images of the entire in-vehicle scene, the quantitative marking content is the upper left and lower right coordinate pairs of the FROI region, and the qualitative marking content is whether the FROI region is included.

By the First Embodiment of the present application, both the HTROI region detector and the FROI region detector are implemented in a CNN forward inference mode. Compared with traditional image recognition methods, the recognition effect is better, and the method can be effectively adapted to an optimization mode of artificial intelligence hardware, such that the detection performance is better.

In the case where the first detector and/or the second detector is obtained, there are a plurality of methods for determining the first image region. Optionally, in the safety belt wearing detection method provided in the First Embodiment of the present application, in the case where the first detector and the second detector are obtained, determining the first image region in the target image includes detecting the target image by the first detector to obtain the first image region; determining the second image region in the target image includes detecting the target image by the second detector to obtain the second image region.

In the case where the first detector is obtained, determining the first image region in the target image includes detecting the target image by the first detector to obtain the first image region; determining the second image region in the target image includes extracting the second image region from the first image region according to preset sitting posture information of the target object.

In the case where the second detector is obtained, determining the second image region in the target image includes detecting the target image by the second detector to obtain the second image region; determining the first image region in the target image includes expanding, in the target image, the second image region downwards, leftwards, and rightwards by preset regions to obtain the first image region according to the preset sitting posture information of the target object.

It should be noted that, in an optional embodiment, the HTROI region detector and the FROI region detector may be respectively obtained by means of a CNN-based method, so that the two-dimensional positions of the HTROI region and the FROI region in the target image are directly obtained by regression according to the input of the entire image.

In an optional embodiment, the HTROI region detector may also be obtained at first by means of the CNN-based method, the HTROI region is detected by the HTROI region detector, and then the FROI region is obtained at the middle of an upper half portion of the HTROI region according to an approximate foreknown posture when a human body is seated in the driver's seat.

In an optional embodiment, the FROI region detector may also be obtained at first by means of the CNN-based method, the FROI region is detected the FROI region detector, and then the FROI region is expanded downwards and towards the two sides according to the approximate foreknown posture when the human body is seated in the driver's seat, to obtain the HTROI region.

In the case where the first image region and/or the second image region is obtained, there are a plurality of methods for determining the third image region. Optionally, in the safety belt wearing detection method provided in the First Embodiment of the present application, determining the third image region according to the first image region and/or the second image region includes: in the case where the first image region in the target image is obtained and the second image region in the target image is obtained, determining a first safety belt wearing region in the target image according to an offset distance, relative to the first image region, of a coverage region in which the safety belt is correctly worn, and determining a second safety belt wearing region in the target image according to an offset distance, relative to the second image region, of the coverage region in which the safety belt is correctly worn; and averaging the first safety belt wearing region and the second safety belt wearing region with respect to spatial positions on the target image, to obtain the third image region.

Specifically, if both the HTROI region and the FROI region are detected in the target image, two SROI regions for detecting whether the human body wears the safety belt may be set on the entire image according to the offsets, relative to the HTROI region and the FROI region, respectively, of the coverage region in which the safety belt is correctly worn. A final SROI region is obtained after the spatial positions of the two SROI regions are averaged, thereby providing a data basis for detecting whether the safety belt is correctly worn.

Optionally, in the safety belt wearing detection method provided in the First Embodiment of the present application, prior to determining the third image region according to the first image region and/or the second image region, the method further includes: acquiring a plurality of human torso region images, marking whether the acquired images include safety belt wearing regions, and marking positions of face regions on the images including the safety belt wearing regions, to obtain a plurality of third marked images; determining the plurality of third marked images as a third training set of data, and training the neural network model through the third training set of data to obtain a third detector configured to detect the safety belt wearing regions. In the case where the first image region and/or the second image region in the target image is obtained, determining the third image region includes inputting the position of the first image region in the target image and/or the position of the second image region in the target image and the first image region into the third detector for detection, to obtain the third image region.

Specifically, in the case where the target object is the driver in the driver's seat, when the third detector configured to detect the safety belt wearing region is trained, the target content of the training set is SROI, the input data is an image range defined by the HTROI region, and the quantitative marking content is the upper left and lower right coordinate pairs of the FROI region in a coordinate system of the image range defined by the HTROI region.

Further, after the third detector is obtained, position coordinates (two-dimensional coordinate values of a upper left point and a lower right point of the HTROI region and the two-dimensional coordinate values of the upper left point and the lower right point of the FROI region, that is, the two-dimensional coordinate values of four points in total) of the HTROI region and the FROI region in the image, and the image of the HTROI region in the entire image may be input into the pre-trained third detector, to obtain the final SROI region by regression.

There are a plurality of methods for determining the third image region. Optionally, in the safety belt wearing detection method provided in the First Embodiment of the present application, prior to determining the third image region according to the first image region and/or the second image region region, the method further includes: acquiring a plurality of human torso region images, marking whether the acquired images include safety belt wearing regions, and marking positions of the safety belt wearing regions on the images including the safety belt wearing regions, to obtain a plurality of fourth marked images; determining the plurality of fourth marked images as a fourth training set of data, and training the neural network model through the fourth training set of data to obtain a fourth detector configured to detect the safety belt wearing regions. In the case where the first image region is detected in the target image, determining the third image region according to the first image region and/or the second image region includes detecting the first image region by the fourth detector to obtain the third image region.

Specifically, the fourth detector configured to detect the safety belt wearing region may be trained through a plurality of human torso region images. The target content of the training set is an STROI region. The input data is HTROI region images. The quantitative marking content is the upper left and lower right coordinate pairs of the SROI region. The qualitative marking content is whether an SROI region is included. Further, after the fourth detector is obtained by training, the HTROI region is detected by the fourth detector to obtain the STROI region.

Optionally, in the safety belt wearing detection method provided in the First Embodiment of the present application, prior to determining the third image region according to the first image region and/or the second image region, the method further includes: acquiring a plurality of images including face regions, marking whether the acquired images include safety belt wearing regions, and marking positions of the safety belt wearing regions on the images including the safety belt wearing regions, to obtain a plurality of fifth marked images; determining the plurality of fifth marked images as fifth training set of data, and training the neural network model through the fifth training set of data to obtain a fifth detector configured to detect the safety belt wearing regions. In the case where the second image region is detected in the target image, determining the third image region according to the first image region and/or the second image region includes detecting the second image region by the fifth detector to obtain the third image region.

Specifically, the fifth detector configured to detect the safety belt wearing region may be trained by a plurality of images including face regions. The target content of the training set is the STROI region. The input data is FROI region images. The quantitative marking content is the upper left and lower right coordinate pairs of the SROI region. The qualitative marking content is whether an SROI region is included. Further, after the fifth detector is obtained by training, the FROI region is detected by the fifth detector to obtain the STROI region.

In addition, if neither of the HTROI region and the FROI region is detected in the target image, it is considered that there is no occupant in the vehicle at this time, and a determination that the safety belt is not worn may be given directly (because there is no occupant) at this time.

After the third region image is obtained, the wearing state of the safety belt is determined according to the third image region. Optionally, in the safety belt wearing detection method provided in the First Embodiment of the present application, prior to determining whether the wearing of the safety belt in the target image meets the preset wearing requirement according to the image information in the third image region, the method further includes: acquiring a plurality of safety belt wearing region images and marking whether the wearing of the safety belt in the acquired images meets the preset wearing requirement, to obtain a plurality of sixth marked images; determining the plurality of sixth marked images as a sixth training set of data, and training the neural network model through the sixth training set of data to obtain a discriminator configured to determine whether the wearing of the safety belt in the target image meets the preset wearing requirement. Determining whether the wearing of the safety belt in the target image meets the preset wearing requirement according to the image information in the third image region includes detecting the third image region by the discriminator to obtain a conclusion of whether the wearing of the safety belt meets the preset wearing requirement.

Specifically, the discriminator configured to determine whether the wearing of the safety belt meets the preset wearing requirement may be trained based on the CNN. The target content of the training set is a qualitative conclusion of whether the safety belt is correctly worn. The input data is an image range defined by the SROI region. The qualitative marking content is whether the safety belt is correctly worn.

Further, after the discriminator is obtained, the image data of the SROI portion in the entire scene image data is sent to the pre-trained discriminator to determine whether the occupant wears the safety belt.

Figure 3:
FIG. 3 is a schematic diagram of detecting whether wearing of a safety belt is correct in the safety belt wearing detection method provided according to the First Embodiment of the present application.

For example, as shown in FIG. 3, the region selected by a black frame is the detected HTROI region. The region selected by a white frame is the detected FROI region. The region selected by a gray frame is the SROI region obtained by means of the FROI region and the HTROI region. After the data of the SROI region is sent to the safety belt discriminator, a correct conclusion of "With Safety Belt" may be obtained.

Figure 4:
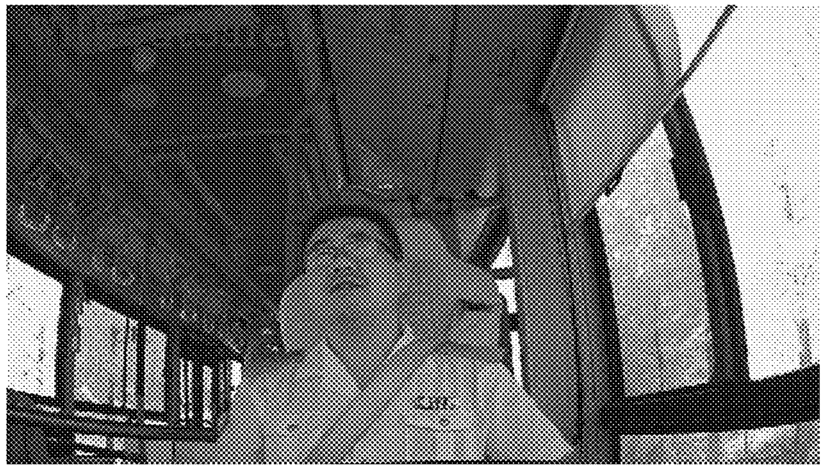
FIG. 4 is a schematic diagram of detecting whether wearing of a safety belt is correct according to an image recognition method in the related art.

If the solution in the embodiment of the present application is not used, for example, the entire target image is sent to the safety belt discriminator, as shown in FIG. 4. Since the feature of the safety belt is weaker than the feature of the human face or human body in the entire image, it is difficult to be recognized by the safety belt discriminator. Therefore, in the same scene, it is difficult to determine the SROI region, and an erroneous conclusion of "Without Safety Belt" may be obtained.

Optionally, in the safety belt wearing detection method provided in the First Embodiment of the present application, after determining whether the wearing of the safety belt in the target image meets the preset wearing requirement according to the image information in the third image region, the method further includes: in a case where the wearing of the safety belt does not meet the preset wearing requirement, sending prompt information, wherein the prompt information is configured to prompt the passenger to correctly wear the safety belt.

Specifically, if the safety belt is incorrectly worn, information indicating that the occupant does not correctly wear the safety belt or does not wear the safety belt is sent to prompt the occupant to correctly wear the safety belt.

Figure 5:
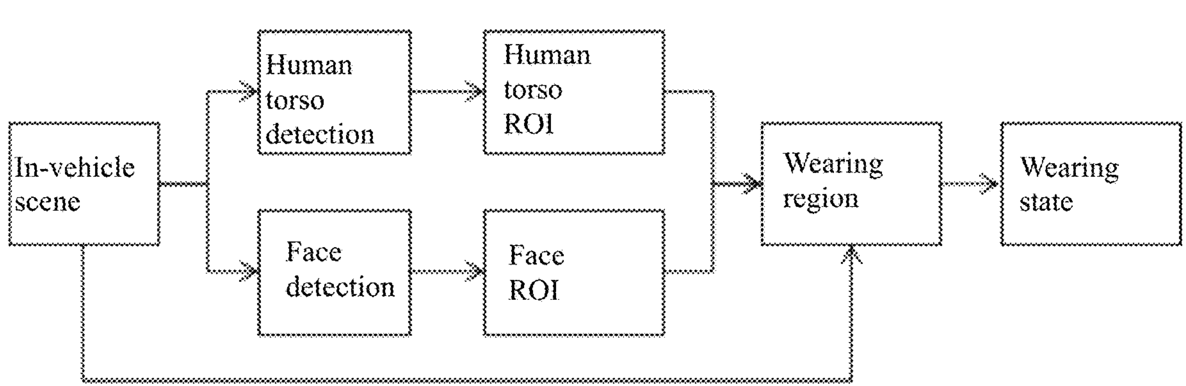
FIG. 5 is a flowchart of an optional safety belt wearing detection method provided according to the First Embodiment of the present application.

FIG. 5 is a schematic diagram of an optional safety belt wearing detection method according to the First Embodiment of the present application.

The method in the First Embodiment of the present application may be run on a PC, a mobile phone, and a current mainstream onboard embedded platform, wherein the onboard embedded platform includes, but is not limited to, an ARM architecture, a DSP architecture, and an ARM+DSP architecture.

As shown in FIG. 5, the method includes the following:

In-vehicle scene image data is acquired. Human torso detection (Human Torso Detection, HTD) is performed on the entire in-vehicle scene image data to obtain a human torso region of interest (Human Torso ROI, HTROI). At the same time, face detection (Face Detection, FD) is performed on the entire in-vehicle scene image data to obtain a face region of interest (Face ROI, FROI).

Further, according to a positional relationship between the HTROI region and the FROI region, a safety belt wearing region of interest (Seatbelt ROI, SROI) is estimated. Position coordinates of the HTROI region and the FROI region in the image and the data of the HTROI portion in the entire scene image data may also be directly sent to a pre-trained regressor based on the convolutional neural network (CNN), to obtain the SROI region by regression.

It should be noted that, if the ROI region is detected in only one of the HTD and FD, the SROI region may also be estimated by using the ROI through the positional relationship only. If neither of the HTROI region and the FROI region is detected, it is considered that there is no occupant in the vehicle at this time, and thus a determination that the safety belt is not worn may be given directly (because there is no occupant) at this time.

Finally, the image data of the SROI region in the entire scene image data is sent to a pre-trained safety belt discriminator based on the convolutional neural network (CNN), to determine whether the occupant wears the safety belt. If the occupant wears the safety belt incorrectly, a prompt that the occupant does not wear the safety belt is also sent.

By the First Embodiment of the present application, on one hand, vision-based non-contact recognition of safety belt wearing states of occupants is realized, such that the result of determining the safety belt wearing states of occupants is more accurate while the device production cost is saved. On the other hand, according to the size of the safety belt in an actual scene and by means of face detection and human torso detection, the detection region of the safety belt may be reduced to highlight the features of the safety belt itself, thereby improving the recognizability of the safety belt wearing region.

Figure 6:
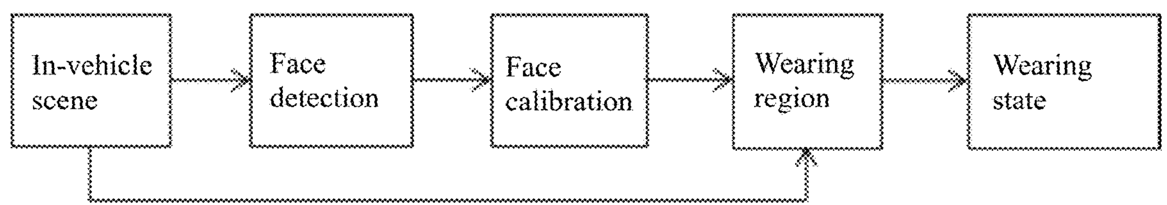
FIG. 6 is a flowchart of an optional safety belt wearing detection method provided according to the First Embodiment of the present application.

FIG. 6 is a schematic diagram of an optional safety belt wearing detection method according to the First Embodiment of the present application.

The method in the First Embodiment of the present application may be run on a PC, a mobile phone, and the current mainstream onboard embedded platform, wherein the onboard embedded platform includes, but is not limited to, an ARM architecture, a DSP architecture, and an ARM+DSP architecture.

As shown in FIG. 6, the method includes the following:

In the case where an occupant sits in a seat in a normal posture and faces straight ahead, a plurality of frames of images are collected in the entire acquired in-vehicle scene data, to obtain a face region of interest (Face ROI, FROI). Since the posture of the passenger is normal, a corresponding FROI region can be necessarily obtained from each frame of image.

Further, averaging is performed according to the positions of the FROI regions of the plurality of frames of images, to obtain an average FROI region. Then according to the average FROI region and a foreknown positional relationship between the FROI region and the SROI region, a safety belt wearing region of interest (ROI, Region of Interest) (Seatbelt ROI, SROI) is obtained by expansion.

Further, for the entire in-vehicle scene image input by each subsequent frame, the image data of the SROI portion thereof is sent to the pre-trained CNN-based safety belt discriminator, to determine whether the occupant wears the safety belt. If the occupant wears the safety belt incorrectly, a prompt that the occupant does not wear the safety belt is also sent.

Figure 7:
FIG. 7 is a schematic diagram of detecting whether the wearing of the safety belt is correct in an optional safety belt wearing detection method provided according to the First Embodiment of the present application.

Specifically, as shown in FIG. 7, the region selected by the white frame is the detected FROI region. The region selected by the gray frame is the SROI that is pre-calibrated through the FROI region. The data of the SROI region is sent to the CNN-based safety belt discriminator to obtain a correct conclusion of "With Safety Belt".

Figure 8:
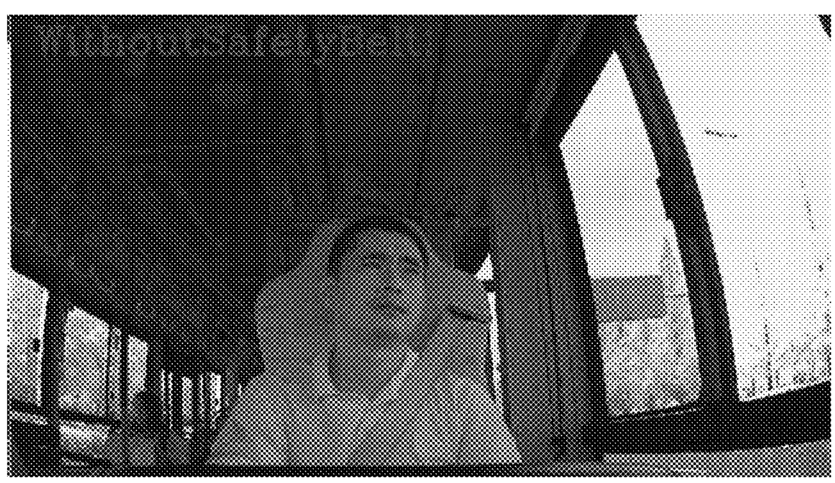
FIG. 8 is a schematic diagram of detecting whether the wearing of the safety belt is correct according to the image recognition method in the related art.

If the solution in the embodiment of the present application is not used, for example, the entire target image is sent to the safety belt discriminator, as shown in FIG. 8. Since the feature of the safety belt is weaker than the feature of the human face in the entire image, it is difficult to be recognized by the safety belt discriminator. Therefore, in the same scene, it is difficult to determine the SROI region, and an error conclusion of "Without Safety Belt" is obtained.

By the First Embodiment of the present application, on one hand, vision-based non-contact recognition of safety belt wearing states of occupants is realized, such that the result of determining the safety belt wearing states of occupants is more accurate while the device production cost is saved. On the other hand, according to the size of the safety belt in an actual scene and by means of face detection and human torso detection, the detection region of the safety belt may be reduced to highlight the features of the safety belt itself, thereby improving the recognizability of the safety belt wearing region.

It should be noted that the steps illustrated in the flowchart of the drawings may be executed in a computer system, such as a group of computer-executable instructions. In addition, although a logical order is shown in the flowchart, in some cases, the illustrated or described steps may be executed in a different order.

The First Embodiment of the present application further provides a safety belt wearing detection apparatus. It should be noted that the safety belt wearing detection apparatus in the First Embodiment of the present application may be used for executing the safety belt wearing detection method provided in the First Embodiment of the present application. The safety belt wearing detection apparatus provided in the First Embodiment of the present application is described below.

Second Embodiment

Figure 9:
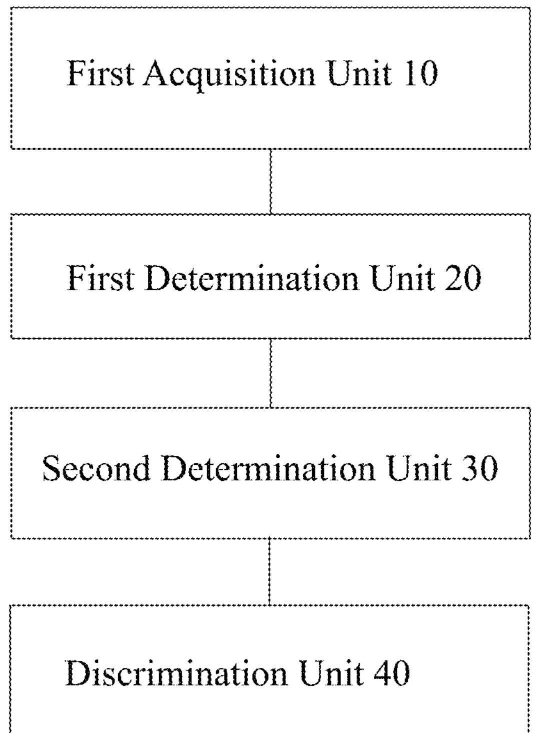
FIG. 9 is a schematic diagram of a safety belt wearing detection apparatus provided according to a Second Embodiment of the present application.

FIG. 9 is a schematic diagram of a safety belt wearing detection apparatus according to the Second Embodiment of the present application. As shown in FIG. 9, the apparatus includes a first acquisition unit 10, a first determination unit 20, a second determination unit 30, and a discrimination unit 40.

Specifically, the first acquisition unit 10 is configured to acquire a target image collected from a traffic device.

The first determination unit 20 is configured to determine a first image region and/or a second image region in the target image, wherein the first image region is a region where a human torso of a target object in the target image is located, and the second image region is a region where a face of the target object in the target image is located.

The second determination unit 30 is configured to determine a third image region according to the first image region and/or the second image region, wherein the third image region is a safety belt wearing region in the target image.

The discrimination unit 40 is configured to determine whether wearing of a safety belt in the target image meets a preset wearing requirement according to image information in the third image region.

The safety belt wearing detection apparatus provided in the Second Embodiment of the present application to accurately determine whether a passenger correctly wears a safety belt by: the first acquisition unit 10 being configured to acquire a target image collected from a traffic device; the first determination unit 20 being configured to determine a first image region and/or a second image region in the target image, wherein the first image region is a region where the human torso of a target object in the target image is located, and the second image region is a region where the face of the target object in the target image is located; the second determination unit 30 being configured to determine a third image region according to the first image region and/or the second image region, wherein the third image region is a safety belt wearing region in the target image; and the discrimination unit 40 being configured to determine whether the wearing of a safety belt in the target image meets a preset wearing requirement according to the image information in the third image region. The safety belt wearing region is determined by means of the region where the human torso of the target object in the target image is located and/or the region where the face of the target object in the target image is located, thereby determining whether the wearing of the safety belt meets the preset wearing requirement, and thus achieving the effect of improving the accuracy of determining whether the passenger correctly wears the safety belt.

Optionally, in the safety belt wearing detection apparatus provided in the Second Embodiment of the present application, in the case where the target image includes an upper body region of the target object, the region where the human torso of the target object is located is a minimum region including a face, a neck, a shoulder and an upper chest, and the region where the face of the target object is located is a minimum region including the face.

Optionally, in the safety belt wearing detection apparatus provided in the Second Embodiment of the present application, the apparatus further includes: a second acquisition unit configured to acquire a plurality of images collected from the traffic device prior to acquiring the target image collected from the traffic device, mark whether the acquired images include human torso regions, and mark positions of the human torso regions on the images including the human torso regions, to obtain a plurality of first marked images; a first training unit configured to determine the plurality of first marked images as a first training set of data, and train a neural network model through the first training set of data, to obtain a first detector configured to detect the human torso regions; and/or a third acquisition unit configured to acquire a plurality of images collected from the traffic device, mark whether the acquired images include face regions, and mark positions of the face regions on the images including the face regions, to obtain a plurality of second marked images; and a second training unit configured to determine the plurality of second marked images as a second training set of data, and train the neural network model through the second training set of data, to obtain a second detector configured to detect the face regions.

Optionally, in the safety belt wearing detection apparatus provided in the Second Embodiment of the present application, the first determination unit 20 includes a first determination module and/or a second determination module. The first determination module is configured to detect the target image by the first detector to obtain the first image region in the case where the first detector and the second detector are obtained. The second determination module is configured to detect the target image by the second detector to obtain the second image region. The first determination module is configured to detect the target image by the first detector to obtain the first image region in the case where the first detector is obtained. The second determination module is configured to extract the second image region from the first image region according to preset sitting posture information of the target object. The second determination module is configured to detect the target image by the second detector to obtain the second image region in the case where the second detector is obtained. The first determination module is configured to expand, in the target image, the second image region downwards, leftwards, and rightwards by preset regions, to obtain the first image region according to the preset sitting posture information of the target object.

Optionally, in the safety belt wearing detection apparatus provided in the Second Embodiment of the present application, the second determination unit 30 includes: a third determination module configured to determine a first safety belt wearing region in the target image according to an offset distance, relative to the first image region, of a coverage region in which the safety belt is correctly worn, and determine a second safety belt wearing region in the target image according to an offset distance, relative to the second image region, of the coverage region in which the safety belt is correctly worn in the case where the first image region in the target image is obtained and the second image region in the target image is obtained; and a fourth determination module configured to average the first safety belt wearing region and the second safety belt wearing region with respect to spatial positions on the target image, to obtain the third image region.

Optionally, in the safety belt wearing detection apparatus provided in the Second Embodiment of the present application, the apparatus further includes: a fourth acquisition unit configured to acquire a plurality of human torso region images, mark whether the acquired images include safety belt wearing regions, and mark positions of face regions on the images including the safety belt wearing regions, to obtain a plurality of third marked images prior to determining the third image region according to the first image region and/or the second image region; a third training unit configured to determine the plurality of third marked images as a third training set of data, and train the neural network model through the third training set of data to obtain a third detector configured to detect the safety belt wearing regions. The second determination unit is further configured to input the position of the first image region in the target image, the position of the second image region in the target image, and the first image region into the third detector for detection, to obtain the third image region.

Optionally, in the safety belt wearing detection apparatus provided in the Second Embodiment of the present application, the apparatus further includes: a fifth acquisition unit configured to acquire a plurality of human torso region images, mark whether the acquired images include safety belt wearing regions, and mark positions of the safety belt wearing regions on the images including the safety belt wearing regions, to obtain a plurality of fourth marked images prior to determining the third image region according to the first image region and/or the second image region; a fourth training unit configured to determine the plurality of fourth marked images as a fourth training set of data, and train the neural network model through the fourth training set of data to obtain a fourth detector configured to detect the safety belt wearing regions. The second determination unit is further configured to detect the first image region by the fourth detector to obtain the third image region.

Optionally, in the safety belt wearing detection apparatus provided in the Second Embodiment of the present application, the apparatus further includes: a sixth acquisition unit configured to acquire a plurality of images including face regions, mark whether the acquired images include safety belt wearing regions, and mark positions of the safety belt wearing regions on the images including the safety belt wearing regions, to obtain a plurality of fifth marked images prior to determining the third image region according to the first image region and/or the second image region; a fifth training unit configured to determine the plurality of fifth marked images as a fifth training set of data, and train the neural network model through the fifth training set of data to obtain a fifth detector configured to detect the safety belt wearing regions. The second determination unit is further configured to detect the second image region by the fifth detector to obtain the third image region.

Optionally, in the safety belt wearing detection apparatus provided in the Second Embodiment of the present application, the apparatus further includes: a seventh acquisition unit configured to acquire a plurality of safety belt wearing region images and mark whether the wearing of the safety belt in the acquired images meets the preset wearing requirement, to obtain a plurality of sixth marked images prior to determining whether the wearing of the safety belt in the target image meets the preset wearing requirement according to the image information in the third image region; a sixth training unit configured to determine the plurality of sixth marked images as a sixth training set of data, and train the neural network model by the sixth training set of data to obtain a discriminator configured to determine whether the wearing of the safety belt in the target image meets the preset wearing requirement. The discrimination unit 40 is further configured to detect the third image region by the discriminator to obtain a conclusion of whether the wearing of the safety belt meets the preset wearing requirement.

Optionally, in the safety belt wearing detection apparatus provided in the Second Embodiment of the present application, the apparatus further includes an information transmission unit configured to send prompt information in the case where the wearing of the safety belt does not meet the preset wearing requirement after determining whether the wearing of the safety belt in the target image meets the preset wearing requirement according to the image information in the third image region, wherein the prompt information is configured to prompt a passenger to correctly wear the safety belt.

The safety belt wearing detection apparatus includes a processor and a memory. The first acquisition unit 10, the first determination unit 20, the second determining unit 30, and the discrimination unit 40 are all stored in the memory as program units. The processor executes the program units stored in the memory to implement corresponding functions.

The processor includes a core, and the core calls corresponding program units from the memory. One or more cores may be provided. The difficulty in the related art to accurately determine whether a passenger correctly wears a safety belt is solved by adjusting the parameters of the core(s).

The memory may include forms such as a non-persistent memory, a random access memory (RAM), and/or a non-volatile memory in a computer-readable medium, such as a read-only memory (ROM) or a flash random access memory (flash RAM). The memory includes at least one storage chip.

An embodiment of the present application further provides a non-volatile storage medium. The non-volatile storage medium includes a stored program, wherein when executed, the program controls a device where the non-volatile storage medium is located to execute a safety belt wearing detection method.

An embodiment of the present application further provides an electronic device including a processor and a memory. Computer-readable instructions are stored in the memory. The processor is configured to execute the computer-readable instructions, wherein when executed, the computer-readable instruction executes a safety belt wearing detection method. The electronic device herein may be a server, a PC, a PAD, a mobile phone, or the like.

Those skilled in the art should understand that the embodiments of the present application may be provided as a method, a system, or a computer program product. Accordingly, the present application may adopt the form of a complete hardware embodiment, a complete software embodiment, or an embodiment combining software with hardware. Moreover, the present application may adopt the form of a computer program product which is implemented on one or more computer-executable storage media (including, but not limited to, a magnetic disk memory, a CD-ROM, an optical memory, and the like) including computer-executable program codes.

The present application is described in accordance with flowcharts and/or block diagrams of the method, the device (system), and the computer program product according to the embodiments of the present application. It should be understood that computer program instructions may realize each step and/or block in the flowcharts and/or the block diagrams, and combinations of the steps and/or blocks in the flowcharts and/or the block diagrams. These computer program instructions may be provided for a general-purpose computer, a special-purpose computer, an embedded processor or processors of other programmable data processing devices, to generate a machine, such that the instructions executed by the computers or the processors of other programmable data processing devices generate apparatuses used for implementing specified functions in one or more steps of the flowcharts and/or one or more blocks of the block diagrams.

These computer program instructions may also be stored in a computer-readable memory which is capable of guiding computers or other programmable data processing devices to work in particular manners, such that the instructions stored in the computer-readable memory generate a product including an instruction apparatus, and the instruction apparatus implements specified functions in one or more steps of the flowcharts and/or one or more blocks of the block diagrams.

These computer program instructions may also be loaded on computers or other programmable data processing devices, to execute a series of operation steps on the computers or other programmable data processing devices to produce processing realized by the computers, such that the instructions executed on the computers or other programmable data processing devices provide steps used for implementing specified functions in one or more steps of the flowcharts and/or one or more blocks of the block diagrams.

In a typical configuration, a computing device includes one or more central processing units (CPU), an input/output interface, a network interface, and a memory.

The memory may include forms such as a volatile memory, a random access memory (RAM) and/or a non-volatile memory in a computer-readable medium, such as a read-only memory (ROM) or a flash random access memory (flash RAM). The memory is an example of the computer-readable medium.

The computer-readable medium includes non-volatile and volatile media, and removable and non-removable media, which may realize information storage by means of any method or technology. The information may be computer-readable instructions, data structures, program modules, or other data. Examples of the storage medium of a computer include, but are not limited to, a phase change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc-read-only memory (CD-ROM), a digital versatile disc (DVD) or other optical memories, a magnetic cassette, a magnetic tape disk memory or other magnetic storage devices or any other non-transmission media, which may be used for storing information that may be accessed by the computing device. According to the definitions herein, the computer-readable medium does not include transitory media (transitory media), such as modulated data signals and carrier waves.

It should also be noted that, the terms "comprise", "include" or any other variants thereof are intended to cover non-exclusive inclusions, such that a process, a method, a commodity, or a device including a series of elements not only includes those elements, but also includes other elements that are not explicitly listed, or also includes elements inherent to such a process, method, commodity, or device. Without further qualification, an element defined by the phrase "including a . . . " does not exclude the existence of other identical elements in the process, the method, the commodity, or the device which includes the element.

Those skilled in the art should understand that the embodiments of the present application may be provided as a method, a system, or a computer program product. Accordingly, the present application may adopt the form of a complete hardware embodiment, a complete software embodiment, or an embodiment combining software with hardware. Moreover, the present application may adopt the form of a computer program product which is implemented on one or more computer-executable storage media (including, but not limited to, a magnetic disk memory, a CD-ROM, an optical memory, and the like) including computer-executable program codes.

The above descriptions are only embodiments of the present application, and are not intended to limit the present application. For those skilled in the art, the present application may have various modifications and changes. Any modifications, equivalent replacements, improvements and the like, made within the spirit and principles of the present application, shall all be encompassed in the scope of the claims of the present application.

INDUSTRIAL APPLICABILITY

The solutions provided in the embodiments of the present application may be applied to the technical field of image recognition. The embodiments of the present application include: acquiring a target image collected from a traffic device; determining a first image region and/or a second image region in the target image, wherein the first image region is a region where a human torso of a target object in the target image is located, and the second image region is a region where a face of the target object in the target image is located; determining a third image region according to the first image region and/or the second image region, wherein the third image region is a safety belt wearing region in the target image; and determining whether the wearing of a safety belt in the target image meets a preset wearing requirement according to image information in the third image region. Safety belt wearing detection is performed by means of the embodiments of the present application, to accurately determine whether a passenger correctly wears a safety belt.

What is claimed is:

1. A safety belt wearing detection method, comprising:

acquiring a target image collected from a traffic device;

determining a first image region and/or a second image region in the target image, wherein the first image region is a region where a human torso of a target object in the target image is located, and the second image region is a region where a face of the target object in the target image is located;

determining a third image region according to the first image region and/or the second image region, wherein the third image region is a safety belt wearing region in the target image; and according to image information in the third image region, determining whether wearing of a safety belt in the target image meets a preset wearing requirement, wherein determining the third image region includes obtaining face regions from a plurality of frames, averaging spatial positions of the face regions to obtain an average face region, and determining the third image region based on the average face region.

2. The method according to claim 1, wherein, in a case where an upper body region of the target object appears in the target image, the region where the human torso of the target object is located is a minimum region comprising the face, a neck, a shoulder and an upper chest, and the region where the face of the target object is located is a minimum region comprising the face.

3. The method according to claim 1, wherein prior to acquiring the target image collected from the traffic device, the method further comprises:

acquiring a plurality of images collected from the traffic device, marking whether the acquired images comprise human torso regions, and marking positions of the human torso regions on the images comprising the human torso regions, to obtain a plurality of first marked images;

determining the plurality of first marked images as a first training set of data, and training a neural network model through the first training set of data to obtain a first detector configured to detect the human torso regions; and/or acquiring a plurality of images collected from the traffic device, marking whether the acquired images comprise face regions, and marking positions of the face regions on the images comprising the face regions, to obtain a plurality of second marked images; and determining the plurality of second marked images as a second training set of data, and training the neural network model through the second training set of data to obtain a second detector configured to detect the face regions.

4. The method according to claim 3, wherein, in a case where the first detector and the second detector are obtained, determining the first image region in the target image comprises detecting the target image by the first detector to obtain the first image region, and determining the second image region in the target image comprises detecting the target image by the second detector to obtain the second image region;

in a case where the first detector is obtained, determining the first image region in the target image comprises detecting the target image by the first detector to obtain the first image region, and determining the second image region in the target image comprises extracting the second image region from the first image region according to preset sitting posture information of the target object; and in a case where the second detector is obtained, determining the second image region in the target image comprises detecting the target image by the second detector to obtain the second image region, and determining the first image region in the target image comprises expanding, in the target image, the second image region downwards, leftwards, and rightwards by preset regions to obtain the first image region according to the preset sitting posture information of the target object.

5. The method according to claim 1, wherein determining the third image region according to the first image region and/or the second image region comprises:

in a case where the first image region in the target image is obtained and the second image region in the target image is obtained, determining a first safety belt wearing region in the target image according to an offset distance of a coverage region in which the safety belt is correctly worn relative to the first image region, and determining a second safety belt wearing region in the target image according to an offset distance of the coverage region in which the safety belt is correctly worn relative to the second image region; and averaging the first safety belt wearing region and the second safety belt wearing region with respect to spatial positions on the target image, to obtain the third image region.

6. The method according to claim 1, wherein prior to determining the third image region according to the first image region and/or the second image region, the method further comprises:

acquiring a plurality of human torso region images, marking whether the acquired images comprise safety belt wearing regions, and marking positions of face regions on the images comprising the safety belt wearing regions, to obtain a plurality of third marked images;

determining the plurality of third marked images as a third training set of data, and training the neural network model through the third training set of data to obtain a third detector configured to detect the safety belt wearing regions, wherein, in a case where the first image region in the target image is obtained and the second image region in the target image is obtained, determining the third image region according to the first image region and/or the second image region comprises:

inputting a position of the first image region in the target image, a position of the second image region in the target image, and the first image region to the third detector for detection, to obtain the third image region.

7. The method according to claim 1, wherein prior to determining the third image region according to the first image region and/or the second image region, the method further comprises:

acquiring a plurality of human torso region images, marking whether the acquired images comprise safety belt wearing regions, and marking positions of the safety belt wearing regions on the images comprising the safety belt wearing regions, to obtain a plurality of fourth marked images;

determining the plurality of fourth marked images as a fourth training set of data, and training the neural network model through the fourth training set of data, to obtain a fourth detector configured to detect the safety belt wearing regions, wherein, in a case where the first image region is detected in the target image, determining the third image region according to the first image region and/or the second image region comprises:

detecting the first image region by the fourth detector to obtain the third image region.

8. The method according to claim 1, wherein prior to determining the third image region according to the first image region and/or the second image region, the method further comprises:

acquiring a plurality of images comprising face regions, marking whether the acquired images comprise safety belt wearing regions, and marking positions of the safety belt wearing regions on the images comprising the safety belt wearing regions, to obtain a plurality of fifth marked images;

determining the plurality of fifth marked images as a fifth training set of data, and training the neural network model through the fifth training set of data to obtain a fifth detector configured to detect the safety belt wearing regions, wherein, in a case where the second image region is detected in the target image, determining the third image region according to the first image region and/or the second image region comprises:

detecting the second image region by the fifth detector to obtain the third image region.

9. The method according to claim 1, wherein prior to determining whether the wearing of the safety belt in the target image meets the preset wearing requirement according to the image information in the third image region, the method further comprises:

acquiring a plurality of safety belt wearing region images and marking whether the wearing of the safety belt in the acquired images meets the preset wearing requirement, to obtain a plurality of sixth marked images;

determining the plurality of sixth marked images as a sixth training set of data, and training the neural network model through the sixth training set of data to obtain a discriminator configured to determine whether the wearing of the safety belt in the target image meets the preset wearing requirement, wherein, determining whether the wearing of the safety belt in the target image meets the preset wearing requirement according to the image information in the third image region comprises:

detecting the third image region by the discriminator to obtain a conclusion of whether the wearing of the safety belt meets the preset wearing requirement.

10. The method according to claim 1, wherein after determining whether the wearing of the safety belt in the target image meets the preset wearing requirement according to the image information in the third image region, the method further comprises:

in a case where the wearing of the safety belt does not meet the preset wearing requirement, sending prompt information, wherein the prompt information is configured to prompt a passenger to correctly wear the safety belt.

11. A safety belt wearing detection apparatus, comprising:

a first acquisition unit configured to acquire a target image collected from a traffic device;

a first determination unit configured to determine a first image region and/or a second image region in the target image, wherein the first image region is a region where a human torso of a target object in the target image is located, and the second image region is a region where a face of the target object in the target image is located;

a second determination unit configured to determine a third image region according to the first image region and/or the second image region, wherein the third image region is a safety belt wearing region in the target image; and a discrimination unit configured to determine whether wearing of a safety belt in the target image meets a preset wearing requirement according to image information in the third image region, wherein determining the third image region includes obtaining face regions from a plurality of frames, averaging spatial positions of the face regions to obtain an average face region, and determining the third image region based on the average face region.

12. A non-transitory storage medium comprising a program stored therein, wherein when executed, the program controls a device where the non-transitory storage medium is located to execute a safety belt wearing detection method comprising:

acquiring a target image collected from a traffic device;

determining a first image region and/or a second image region in the target image, wherein the first image region is a region where a human torso of a target object in the target image is located, and the second image region is a region where a face of the target object in the target image is located;

determining a third image region according to the first image region and/or the second image region, wherein the third image region is a safety belt wearing region in the target image; and according to image information in the third image region, determining whether wearing of a safety belt in the target image meets a preset wearing requirement, wherein determining the third image region includes obtaining face regions from a plurality of frames, averaging spatial positions of the face regions to obtain an average face region, and determining the third image region based on the average face region.

13. An electronic device comprising a processor and a memory storing computer-readable instructions, the processor being configured to execute the computer-readable instructions, wherein when executed, the computer-readable instructions execute a safety belt wearing detection method comprising:

acquiring a target image collected from a traffic device;

determining a first image region and/or a second image region in the target image, wherein the first image region is a region where a human torso of a target object in the target image is located, and the second image region is a region where a face of the target object in the target image is located;

determining a third image region according to the first image region and/or the second image region, wherein the third image region is a safety belt wearing region in the target image; and according to image information in the third image region, determining whether wearing of a safety belt in the target image meets a preset wearing requirement, wherein determining the third image region includes obtaining face regions from a plurality of frames, averaging spatial positions of the face regions to obtain an average face region, and determining the third image region based on the average face region.

* * * * *